(12) United States Patent
Pearson et al.

(10) Patent No.: US 7,899,870 B2
(45) Date of Patent: Mar. 1, 2011

(54) DETERMINATION OF PARTICIPATION IN A MALICIOUS SOFTWARE CAMPAIGN

(75) Inventors: Malcolm Erik Pearson, Kirland, WA (US); Mihai Costea, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 11/767,860

(22) Filed: Jun. 25, 2007

(65) Prior Publication Data

US 2008/0320095 A1      Dec. 25, 2008

(51) Int. Cl.
G06F 15/16      (2006.01)
(52) U.S. Cl. ........................... 709/206; 709/224
(58) Field of Classification Search ............... 709/206, 709/224
See application file for complete search history.

(56) References Cited

U.S. PATENT DOCUMENTS

| | | | |
|---|---|---|---|
| 6,052,709 A | 4/2000 | Paul | 709/202 |
| 6,941,348 B2 * | 9/2005 | Petry et al. | 709/206 |
| 7,007,302 B1 | 2/2006 | Jagger et al. | 726/25 |
| 7,016,939 B1 * | 3/2006 | Rothwell et al. | 709/206 |
| 7,117,358 B2 * | 10/2006 | Bandini et al. | 713/153 |
| 7,272,853 B2 * | 9/2007 | Goodman et al. | 726/13 |
| 7,346,700 B2 * | 3/2008 | Gould et al. | 709/232 |
| 7,490,131 B2 * | 2/2009 | Maller | 709/206 |
| 7,539,871 B1 * | 5/2009 | Osborn | 713/176 |
| 7,668,920 B2 * | 2/2010 | Lin et al. | 709/206 |
| 2003/0154394 A1 * | 8/2003 | Levin | 713/200 |
| 2004/0083270 A1 | 4/2004 | Heckerman et al. | 709/207 |
| 2005/0021649 A1 * | 1/2005 | Goodman et al. | 709/207 |
| 2005/0193073 A1 * | 9/2005 | Mehr et al. | 709/206 |
| 2005/0204012 A1 * | 9/2005 | Campbell | 709/206 |
| 2005/0204159 A1 * | 9/2005 | Davis et al. | 713/201 |
| 2005/0262209 A1 * | 11/2005 | Yu | 709/206 |
| 2005/0278620 A1 * | 12/2005 | Baldwin et al. | 715/513 |
| 2006/0015561 A1 | 1/2006 | Murphy et al. | 709/206 |

(Continued)

FOREIGN PATENT DOCUMENTS

WO      WO 01/53965 A1      7/2001

OTHER PUBLICATIONS

Clayton, R., "Anonymity and Traceability in Cyberspace" Aug. 2005, University of Cambridge, Darwin College, http://www.cl.cam.ac.uk/~rncl/thesis.pdf, 189 pages.

(Continued)

*Primary Examiner*—Saleh Najjar
*Assistant Examiner*—Waseem Ashraf
(74) *Attorney, Agent, or Firm*—Woodcock Washburn LLP

(57) ABSTRACT

Sources of spam, such as botnets, are detected by analyzing message traffic for behavioral patterns and indications of suspicious content. The content of a known malicious source is analyzed. Message traffic associated with the known malicious source is analyzed. Associated message traffic includes messages sent directly from the known malicious source to recipients, and messages sent from the recipients to subsequent direct and indirect recipients. Portions of the content of the known malicious source are selected and content of associated message traffic is analyzed for an indication of the selected content. If the selected content is found in the content of a message, the source of the message is determined to be a source of spam. Associated message traffic is additionally analyzed for behavioral patterns, such as anomalies and/or flurries of activity, to determine a potential malicious source.

17 Claims, 3 Drawing Sheets

U.S. PATENT DOCUMENTS

| | | | |
|---|---|---|---|
| 2006/0015563 A1 | 1/2006 | Judge et al. | 709/206 |
| 2006/0026242 A1* | 2/2006 | Kuhlmann et al. | 709/206 |
| 2006/0031483 A1 | 2/2006 | Lund et al. | 709/224 |
| 2006/0036693 A1* | 2/2006 | Hulten et al. | 709/206 |
| 2006/0195542 A1* | 8/2006 | Nandhra | 709/207 |
| 2006/0242245 A1* | 10/2006 | Christensen | 709/206 |
| 2006/0277264 A1 | 12/2006 | Rainisto | 709/206 |
| 2007/0006308 A1 | 1/2007 | Desouza et al. | 726/24 |
| 2007/0041372 A1 | 2/2007 | Rao et al. | 370/356 |
| 2007/0061404 A1* | 3/2007 | Maller | 709/206 |
| 2007/0083929 A1* | 4/2007 | Sprosts et al. | 726/22 |
| 2007/0124384 A1* | 5/2007 | Howell et al. | 709/206 |
| 2007/0220607 A1* | 9/2007 | Sprosts et al. | 726/24 |
| 2007/0250919 A1* | 10/2007 | Shull et al. | 726/7 |
| 2007/0282952 A1* | 12/2007 | Lund et al. | 709/206 |
| 2007/0299915 A1* | 12/2007 | Shraim et al. | 709/206 |
| 2008/0082658 A1* | 4/2008 | Hsu et al. | 709/224 |
| 2008/0086532 A1* | 4/2008 | Cunningham | 709/206 |

OTHER PUBLICATIONS

Florencio, D. et al., "Analysis and Improvement of Anti-Phishing Schemes", http://research.microsoft.com/users/cormac/papers/mainsec2006.pdf, 11 pages.

Hirt, A. et al., "Anonymous and Malicious", *Virus Bulletin Conference*, Oct. 2005, http://pages.cpsc.ucalagary.ca, 2-8.

\* cited by examiner

US 7,899,870 B2

DETERMINATION OF PARTICIPATION IN A MALICIOUS SOFTWARE CAMPAIGN

TECHNICAL FIELD

The technical field relates generally to computer processing and more specifically to relates to detecting spam, spam botnets, and spam campaigns.

BACKGROUND

Spammers are leveraging more and more armies of infected PCs to deliver malicious content. These infected PCs are often referred to as botnets. The term botnet generally refers to a group of infected processors (commonly referred to as zombie computers) executing and/or spreading malicious software (spam), such as viruses, worms, Trojan horses, and the like. Typically, the owner or user of a zombie computer does not known it is infected and a source of spam. Lists of known sources of spam can be found on a variety of block lists. A block list can be utilized to refuse to receive email and the like from IP (Internet protocol) sources on the list. The generation of block lists however, is gradual and slow, and thus does not provide a mechanism for quickly discovering sources of spam. At any point in time, it is estimated that less than 9% of existing botnet sources are listed on a block list.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A mechanism for detecting IP sources analyses traffic for behavioral patterns and identifiers of suspicious content. The mechanism can provide quick detection of IP sources that are not yet listed on a block list. The mechanism can be utilized to detect botnet zombie computers, spam campaigns, phish campaigns, and the like. In an example embodiment, the content from a known malicious source is analyzed. Portions of the content are identified. Content of associated message traffic (e.g., email content) is analyzed for the identified content. Associated message traffic includes message traffic sent from the malicious source (step 12) of the selected malicious message, message traffic to and from the recipients of the message traffic from the malicious source, message traffic to and from those recipients, including subsequent direct and indirect recipients. If the identified content is found in the content of a message, the IP source of the message is determined to be a potential malicious source. The message traffic is additionally analyzed for behavioral patterns, such as anomalies and/or flurries of activity, to determine if the IP source is a potential malicious source.

BRIEF DESCRIPTION OF THE DRAWINGS

The foregoing summary, as well as the following detailed description, is better understood when read in conjunction with the appended drawings. For the purpose of illustrating automatic detection of participation in a malicious software campaign, there is shown in the drawings exemplary constructions thereof; however, automatic detection of a spam source is not limited to the specific methods and instrumentalities disclosed.

DETAILED DESCRIPTION OF ILLUSTRATIVE EMBODIMENTS

Malicious software can include spam. Spam, generally, is the abuse of a messaging system to provide large numbers of messages. Typically, the messages are unsolicited and often the messages are indiscriminately sent to large numbers of intended recipients. Spam is often thought of as applicable to email, however spam is not limited thereto. Spam applies to all types of message systems, for example, email spam, mobile phone message spam, web search engine spam, instant message spam, newsgroup spam, fax spam, and the like. The reasons for sending spam are varied. For example, spam can be utilized to send bulk advertisements to many recipients. Spam also can be used to bog down systems via the volume of message traffic created by the spam.

In an example embodiment, a potential source of spam, and more particularly, participation in a malware campaign, is determined by analyzing the content of message traffic and by analyzing message traffic patterns. A message from a known malicious source is analyzed to identify a portion or portions that are likely to be in similar messages as part of a spam campaign, or the like. Content of message traffic is analyzed to determine if the identified portion, or portions, is contained therein. If so, the source of the message is determined to be a potential source of spam. Message traffic also is analyzed to determine if significant changes and/or anomalies occur. If so, the source of the message is determined to be a potential source of spam.

Figure 1:
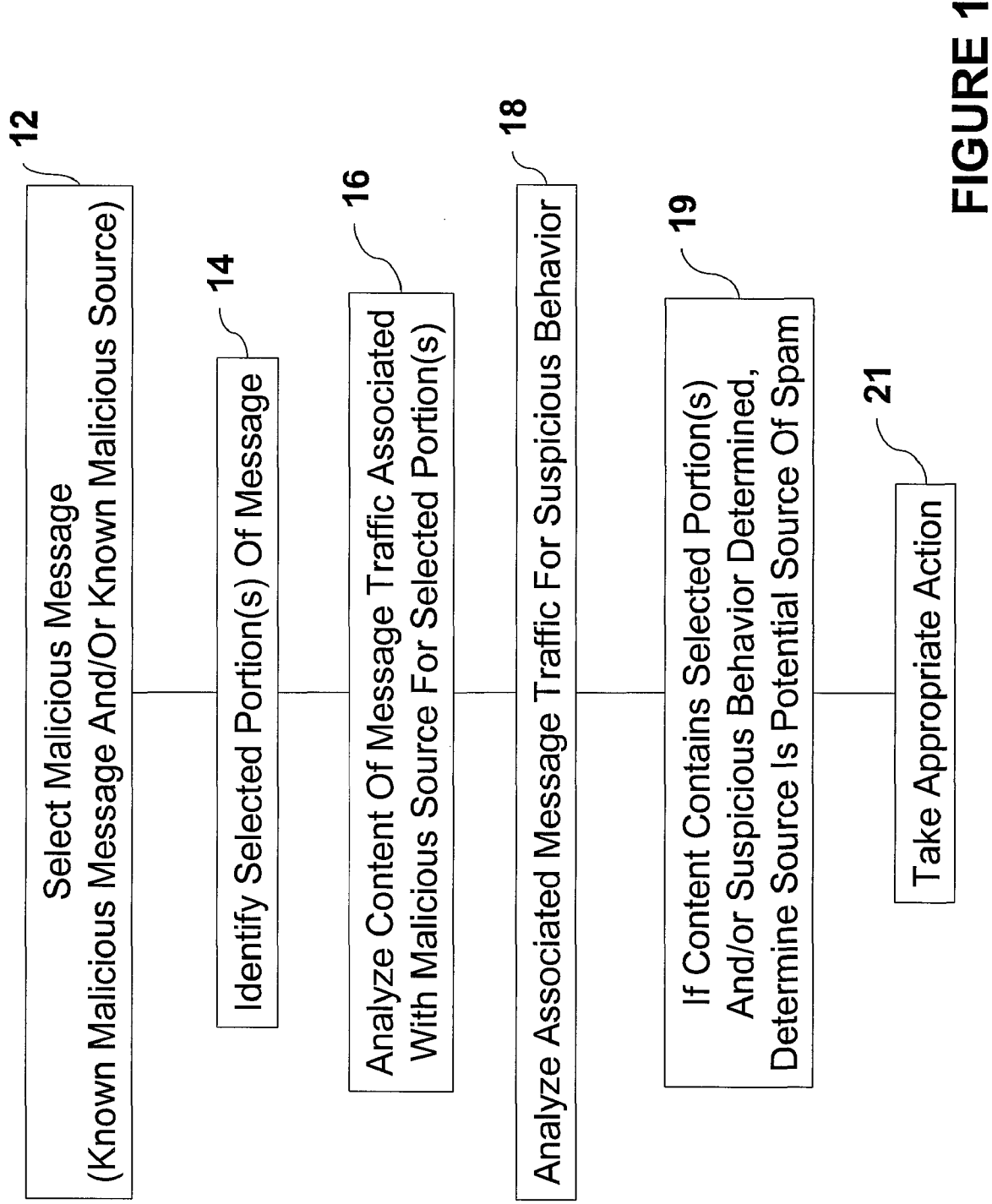
FIG. 1 is a flow diagram of an example process for automatic detection of participation in a malware campaign.

FIG. 1 is a flow diagram of an example process for automatically detecting a source of spam. A malicious message is selected at step 12. A malicious message can comprise a known spam message and/or a message from a known source of spam. A malicious message can be selected by any appropriate means, such as from a block list for example. The content of the selected malicious message is analyzed at step 14. The content is analyzed to determine and identify a portion of the content, or portions of the content, that is likely to be contained in the content of other spam messages (e.g., part of the botnet herd). The portion, or portions, of the content are selected to be utilized to analyze the content of message traffic.

In an example embodiment, an identifier, such as a fingerprint or the like, is generated from the selected portion(s) and the identifier is utilized to analyze (step 19) message traffic content. The identifier can comprise any appropriate identifier of a selected portion of content. The identifier can comprise, for example, a hash, a cryptographic has, an indication of an identifiable of a selected portion, or a combination thereof. For example, the identifier can comprise a digital hash extracted from specific message parts. Message parts can include text and/or images. Thus, in a scenario in which a spam message comprises an image or arrives as part of an image (e.g., jpeg or the like), a characteristic, or characteristics, of the image can be utilized as the identifier.

At step 16, message traffic associated with the malicious message/source is analyzed to determine if a message in the message traffic comprises the selected portion(s). Message traffic associated with the malicious source includes message traffic sent from the malicious source (step 12) of the selected malicious message, message traffic to the recipients of the message traffic from the malicious source, message traffic to and from those recipients, and on and on. The content of messages in the associated message traffic is analyzed to determine if the selected portion(s) are contained therein. In an example embodiment wherein an identifier (e.g., hash value) of the selected portion is generated, identifiers of content corresponding to the selected portion(s) of message in the associated message traffic are generated. The identifiers are compared to determine if messages of the message traffic comprises the selected portion(s).

At step 18, message traffic associated with the malicious source is analyzed for suspicious behavior. Suspicious behavior can comprise any appropriate suspicious behavior that could indicate a spam campaign or the like. Suspicious behavior can comprise, for example, an increase in message traffic, anomalies such as invalid address rejections, or a combination thereof. For example, spammers are known to utilize directory harvesting to send spam to a large number of intended recipients. Directory harvesting comprises generating variants of an address and sending the spam message to the generated addresses. As an example, a spammer could spend a spam message to "john," "johna," "johnb," "johnc," and so on. The result of directory harvesting would most likely result in suspicious behavior. Many of the addresses would most likely be invalid, resulting in invalid address rejections. Also, the quantity of messages in the message traffic would increase at a rate greater than an average rate of increase.

At step 19, if message traffic content is determined to contain the selected portion(s) of a spam message and/or suspicious behavior is determined, the source of the message is determined to be a potential source of spam. Accordingly, appropriate action is taken at step 21. Appropriate action can comprise any appropriate action, such as refusing to accept a message from the potential malicious source, slowing the response time to a message from a potential malicious source, quarantining a message from a potential malicious source, or a combination thereof, for example.

Thus, starting with a set of known bad/spammy (malicious) senders or samples of malicious content, during filtering of messages associated with the malicious senders, information pertaining thereto is maintained. Other sources that sent the same content are determined. Other content (spam campaigns) that were sent by the newly discovered "known bad senders" are determined. And the process of determining anomalies and determining patterns indicative of suspicious behavior in the message traffic is iteratively repeated.

In an example embodiment, information associated with the malicious sender/message is stored in a database or the like (e.g., database associated with a message transfer agent, MTA). The information can comprise any appropriate information, such as a sending/source IP address, a sending/source domain, a fingerprint of message content). Upon determining that a message may be spam or the like, the database is queried for other senders that sent the same message. This results in exposing previously unknown botnet, or the like, participants. Once an IP address is determined to be a botnet participant, the process of determining anomalies and correlating message traffic patterns is repeated. Determining anomalies, as described above, can include, for example, protocol rejections for the part of the botnet that does namespace mining in order to obtain a valid address book) and determining that a sender is sending messages on behalf of multiple domains (e.g., rapidly changing domains for an IP, which is something that a typical MTA does not normally do).

In an example embodiment, behavioral patterns in message traffic are correlated to detect suspicious behavior. The message traffic can be analyzed to determine if, for example, a flurry of activity (e.g., message campaign) occurs. The activity can be determined automatically and/or with human intervention. For example, a system administrator of an enterprise system can receive a message indicating that a flurry of email activity is occurring. The administrator can determine, by analyzing the message content of the email, if the flurry of activity if legitimate, such as an announcement by management, or suspicious.

Figure 2:
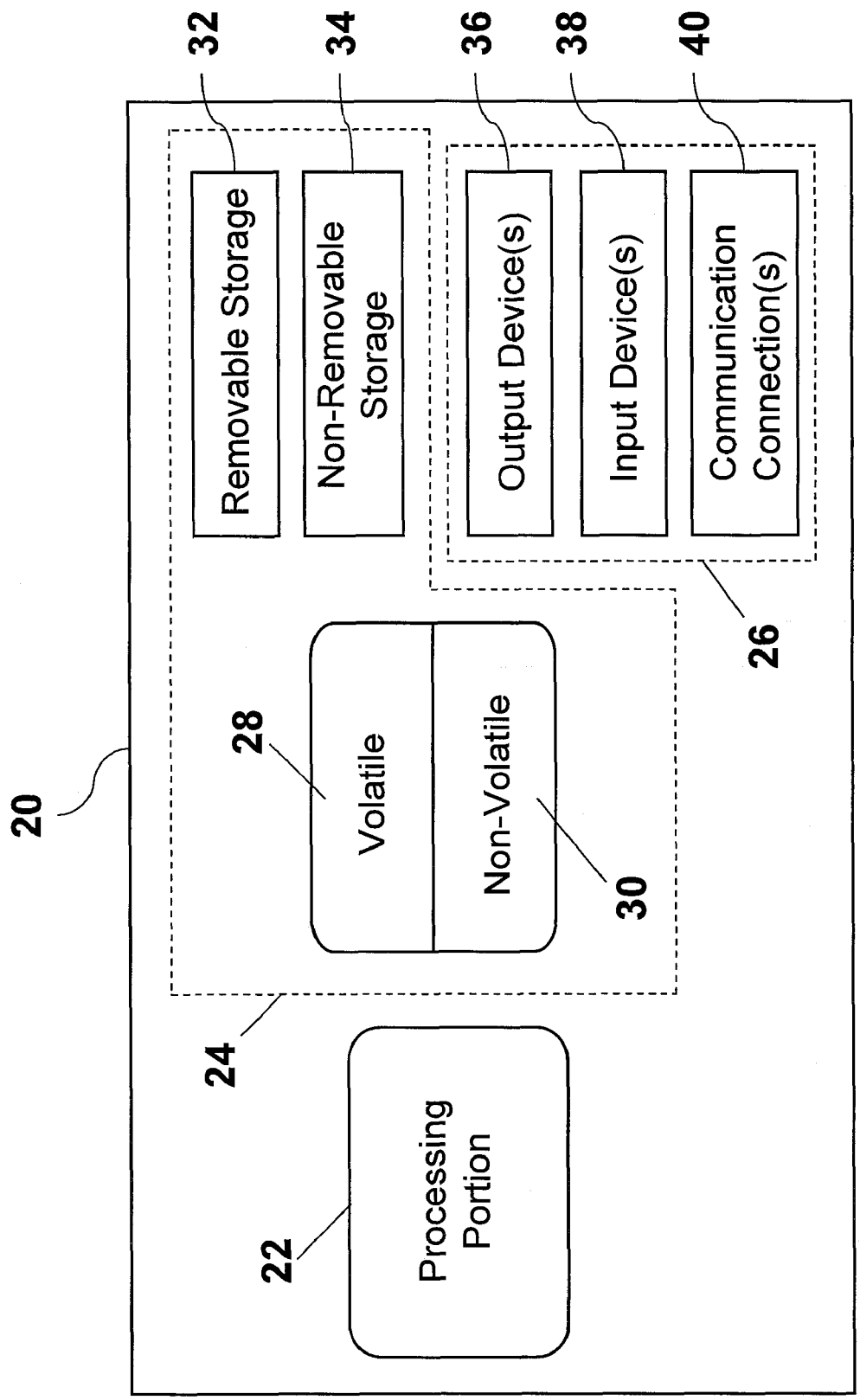
FIG. 2 is a block diagram of an example system configured to implement automatic detection of participation in a malware campaign.

FIG. 2 is a diagram of an exemplary processor 20 for implementing automatic detection of participation in a malware campaign. The processor 20 comprises a processing portion 22, a memory portion 24, and an input/output portion 26. The processing portion 22, memory portion 24, and input/output portion 26 are coupled together (coupling not shown in FIG. 2) to allow communications therebetween. The input/output portion 26 is capable of providing and/or receiving components utilized to perform automatic detection of participation in a malware campaign as described above. For example, the input/output portion 26 is capable of providing and receiving an identifier of selected portions of a malicious message, an indication that a message is suspicious, an indication that an IP address is suspicious, an indication of appropriate action to take, or a combination thereof.

The processing portion 22 is capable of implementing automatic detection of participation in a malware campaign as described above. For example, the processing portion 22 is capable of selecting a malicious message, selecting a malicious source, identifying a selected portion of a malicious message, analyzing content of a message, determining if message traffic is associated with a malicious message and/or source, analyzing message traffic associated with a malicious source and/or message, determining appropriate action, taking appropriate action, or a combination thereof.

The processor 20 can be implemented as a client processor and/or a server processor. In a basic configuration, the processor 20 can include at least one processing portion 22 and memory portion 24. The memory portion 24 can comprise the history table. The memory portion 24 can store any information utilized in conjunction with automatic detection of participation in a malware campaign. Depending upon the exact configuration and type of processor, the memory portion 24 can be volatile (such as RAM) 28, non-volatile (such as ROM, flash memory, etc.) 30, or a combination thereof. The processor 20 can have additional features/functionality. For example, the processor 20 can include additional storage (removable storage 32 and/or non-removable storage 34) including, but not limited to, magnetic or optical disks, tape, flash, smart cards or a combination thereof. Computer storage media, such as memory portion 24, 28, 30, 32, and 34, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 20. Any such computer storage media can be part of the processor 20.

The processor 20 can also contain communications connection(s) 40 that allow the processor 20 to communicate with other devices, such as other devices, for example. Communications connection(s) 40 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 20 also can have input device(s) 38 such as keyboard, mouse, pen, voice input device, touch input device, etc. Output device(s) 36 such as a display, speakers, printer, etc. also can be included.

Figure 3:
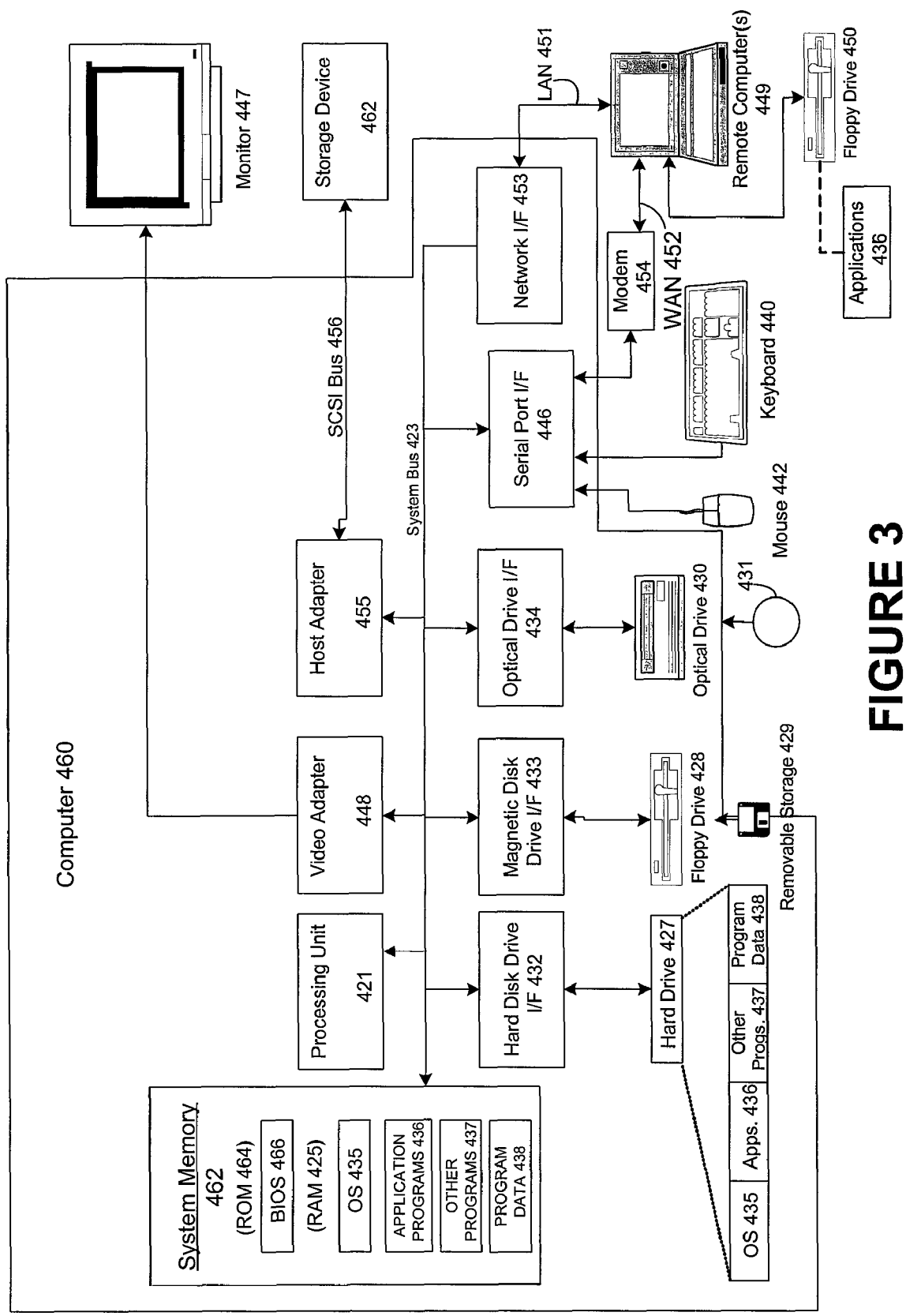
FIG. 3 is a depiction of a suitable computing environment in which automatic detection of sources of malware can be implemented.

FIG. 3 and the following discussion provide a brief general description of a suitable computing environment in which automatic detection of participation in a malware campaign can be implemented. Although not required, various aspects of automatic detection of participation in a malware campaign can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementations of automatic detection of participation in a malware campaign can be practiced with other computer system configurations, including hand held devices, multi processor systems, microprocessor based or programmable consumer electronics, network PCs, minicomputers, mainframe computers, and the like. Further, automatic detection of participation in a malware campaign also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with automatic detection of participation in a malware campaign as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 3, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 3 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 3. The logical connections depicted in FIG. 3 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of automatic detection of participation in a malware campaign are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for automatic detection of participation in a malware campaign, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing automatic detection of participation in a malware campaign.

The program(s) can be implemented in assembly or machine language, if desired. In any case, the language can be a compiled or interpreted language, and combined with hardware implementations. The methods and apparatuses for implementing automatic detection of participation in a malware campaign also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of automatic detecting spam. Additionally, any storage techniques used in connection with automatic detection of participation in a malware campaign can invariably be a combination of hardware and software.

While automatic detection of participation in a malware campaign has been described in connection with the example embodiments of the various figures, it is to be understood that other similar embodiments can be used or modifications and additions can be made to the described embodiments for performing the same functions associated with automatic detection of participation in a malware campaign without deviating therefrom. Therefore, automatic detection of participation in a malware campaign as described herein should not be limited to any single embodiment, but rather should be construed in breadth and scope in accordance with the appended claims.

What is claimed:

1. A computer-implemented method for detecting spam sources not currently listed on a blocked list, the method comprising:

selecting a malicious message indicative of spam from a known spam source on the blocked list;
selecting a portion of content of the malicious message likely to be contained in other spam messages;
generating a first identifier from the portion of content for identifying spam associated with the known spam source;
analyzing a content of a first message transmitted by the known spam source to a first recipient, for detecting in the first message, a second identifier that is consistent with the first identifier;
if the second identifier is found in the first message:
   querying a database containing information of one or more recipients that re-transmitted the first message at least once;
   obtaining the identity of the first recipient from the database, if the first recipient is one amongst the one or more recipients that re-transmitted the first message at least once;
   analyzing message traffic patterns associated with the first recipient, for detecting a suspicious behavior; and
   if the suspicious behavior is detected, declaring the first recipient an additional source of spam.

2. A method in accordance with claim 1, wherein the known spam source is part of a malicious software campaign.

3. A method in accordance with claim 1, wherein the first message is selected based on suspicious behavior, the suspicious behavior comprising an increase in message traffic activity.

4. A method in accordance with claim 3, wherein the increase in message traffic is indicative of directory harvesting.

5. A method in accordance with claim 1, further comprising:
analyzing, for an indication of spam, messages sent from the known spam source to intended recipients; and
analyzing, for an indication of spam, messages sent from the first recipient.

6. A method in accordance with claim 1, further comprising:
slowing a response time to a message received from the first recipient during the period of time when determining if the first recipient is a botnet participant.

7. A system for detecting spam sources not currently listed on a blocked list, the system comprising:
a processor, wherein the processor is configured to:
   select a malicious message indicative of spam from a known spam source on the blocked list;
   select a portion of content of the malicious message indicative of spam;
   generate a first identifier from the portion of content for identifying spam associated with the known spam source, wherein the identifier comprises a first hash;
   analyze a content of a message carried in message traffic associated with the known spam source to generate a second identifier comprising a second hash, wherein the message traffic is transmitted from the known spam source to first recipients;
   if the first identifier is consistent with the second identifier:
      querying a database containing information of one or more first recipients that re-transmitted the first message at least once;
      obtaining identification information of a first recipient from amongst the at least one of the first recipients;
      analyzing patterns in message traffic associated with the first recipient for detecting a suspicious behavior; and
      if, the suspicious behavior is detected, declaring the first recipient an additional source of spam.

8. A system in accordance with claim 7, wherein the known spam source is part of a malicious software campaign.

9. A system in accordance with claim 7, wherein the suspicious behavior comprises an increase in message traffic activity.

10. A system in accordance with claim 9, wherein the increase in message traffic is indicative of directory harvesting.

11. A system in accordance with claim 7, wherein the suspicious behavior comprises a plurality of invalid address rejections.

12. A system in accordance with claim 7, wherein the first and second hashes comprise cryptographic hashes.

13. A system in accordance with claim 7, wherein the processor is further configured to, if a new source of spam is determined, performing one of:
refuse to accept a message from the new spam source; and
slow a response to a message received from the new spam source.

14. A tangible computer-readable storage having stored thereon computer-executable instructions for detecting spam sources not currently listed on a blocked list said instructions comprising: selecting a malicious message indicative of spam from a known spam source on the blocked list; selecting a portion of content of the malicious message likely to be contained in other spam messages; generating a first identifier from the portion of content for identifying spam associated with the known spam source; analyzing a content of a first message transmitted by the known spam source to a first recipient, for detecting in the first message, a second identifier that is consistent with the first identifier; if the second identifier is found in the first message: querying a database containing information of one or more recipients that re-transmitted the first message at least once; obtaining the identity of the first recipient from the database, if the first recipient is one amongst the one or more recipients that re-transmitted the first message at least once; analyzing message traffic patterns associated with the first recipient, for detecting a suspicious behavior; and if the suspicious behavior is detected, declaring the first recipient an additional source of spam.

15. The tangible computer-readable storage in accordance with claim 14, wherein the first message is selected based on suspicious behavior, the suspicious behavior comprising at least one of: an increase in message traffic activity; and a plurality of invalid address rejections.

16. The tangible computer-readable storage in accordance with claim 14, the computer-executable instructions further comprising: analyzing, for an indication of spam, messages sent from the spam source of the malicious message to intended recipients; and analyzing, for an indication of spam, messages sent from the first recipient.

17. The tangible computer-readable storage in accordance with claim 14, the computer-executable instructions further comprising, if a potential new spam source is suspected, performing: slowing a response to a message received from the potential new spam source.

* * * * *